(12) United States Patent
Allgeier et al.

(10) Patent No.: US 11,785,894 B2
(45) Date of Patent: Oct. 17, 2023

(54) INDOOR GARDENING APPLIANCE INCLUDING GROW TOWER WITH MODULAR GROW MODULES

(71) Applicant: Haier US Appliance Solutions, Inc., Wilmington, DE (US)

(72) Inventors: Brian Allgeier, Louisville, KY (US); Lauren Nicole Platts, Louisville, KY (US); Tatiana Ferrucio Ferreira, Rochester, NY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 57 days.

(21) Appl. No.: 17/471,365

(22) Filed: Sep. 10, 2021

(65) Prior Publication Data

US 2023/0080951 A1    Mar. 16, 2023

(51) Int. Cl.
*A01G 9/02* (2018.01)
*A01G 9/12* (2006.01)
*A01G 9/24* (2006.01)

(52) U.S. Cl.
CPC ............... *A01G 9/023* (2013.01); *A01G 9/12* (2013.01); *A01G 9/246* (2013.01); *A01G 9/247* (2013.01); *A01G 9/249* (2019.05)

(58) Field of Classification Search
CPC .......... A01G 9/023; A01G 9/12; A01G 9/247; A01G 9/23; A01G 9/0295; A01G 9/0297
See application file for complete search history.

(56) References Cited

U.S. PATENT DOCUMENTS

| | | |
|---|---|---|
| 4,631,861 A | 12/1986 | Wuthrich |
| 8,499,492 B2 | 8/2013 | Kassouni |
| D853,272 S | 7/2019 | Stevens |
| 10,874,065 B2 | 12/2020 | McGuinness |
| 2012/0167460 A1 | 7/2012 | Omidi |
| 2013/0333283 A1 | 12/2013 | Patterso, Sr. |
| 2018/0295800 A1 | 10/2018 | Kiernan |
| 2020/0037514 A1* | 2/2020 | Massey ................... A01G 9/26 |
| 2020/0037526 A1* | 2/2020 | Sperry .................. A01G 31/06 |
| 2021/0084834 A1* | 3/2021 | Hunter ..................... A01G 9/24 |

FOREIGN PATENT DOCUMENTS

JP    3156092 U    12/2009

\* cited by examiner

*Primary Examiner* — Joshua J Michener
*Assistant Examiner* — Henry Hooper Mudd
(74) *Attorney, Agent, or Firm* — Dority & Manning, P.A.

(57) ABSTRACT

A gardening appliance includes a liner positioned within a cabinet and defining a grow chamber, and a grow tower is positioned within the grow chamber and includes a module support frame including a plurality of vertical support members a plurality of mounting slots. A grow module defines a support body defining a plurality of apertures for receiving one or more plant pods, the grow module further including a plurality of mounting tabs configured for receipt within the plurality of mounting slots to removably mount the grow module to the module support frame.

20 Claims, 14 Drawing Sheets

INDOOR GARDENING APPLIANCE INCLUDING GROW TOWER WITH MODULAR GROW MODULES

FIELD OF THE INVENTION

The present subject matter relates generally to systems for gardening plants indoors, and more particularly, to indoor gardening appliances that include grow towers with modular, simple to install grow modules.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Certain indoor gardening appliances include a grow tower that includes features for supporting a plurality of plants. For example, conventional grow towers include openings for receiving plant pods that contains seeds or other plant material. The plant pods are passed at least partially through the opening and into a root chamber where the plant roots may be supplied with the hydration and nutrients necessary for growth. However, the grow towers typically provide little versatility in terms of the number, type, and position of plant pods that may be inserted therein. For example, the grow towers and aperture are typically fixed structures capable of receiving specific plants that grow in a predictable manner.

Accordingly, an improved indoor gardening appliance would be useful. More specifically, an indoor gardening appliance with a grow tower that facilitates versatile plant growth and improved customization would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance defining a vertical direction and a horizontal direction is provided and includes a liner positioned within a cabinet and defining a grow chamber and a grow tower positioned within the grow chamber and defining an axial direction, a circumferential direction, and a radial direction. The grow tower includes a module support frame comprising a plurality of vertical support members, each of the plurality of vertical support members defining a plurality of mounting slots and a grow module defining a support body defining a plurality of apertures for receiving one or more plant pods, the grow module further comprising a plurality of mounting tabs configured for receipt within the plurality of mounting slots to removably mount the grow module to the module support frame.

In another exemplary embodiment, a grow tower for a gardening appliance is provided. The gardening appliance includes a liner positioned within a cabinet and defining a grow chamber. The grow tower includes a module support frame comprising a plurality of vertical support members, each of the plurality of vertical support members defining a plurality of mounting slots and a grow module defining a support body defining a plurality of apertures for receiving one or more plant pods, the grow module further comprising a plurality of mounting tabs configured for receipt within the plurality of mounting slots to removably mount the grow module to the module support frame.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
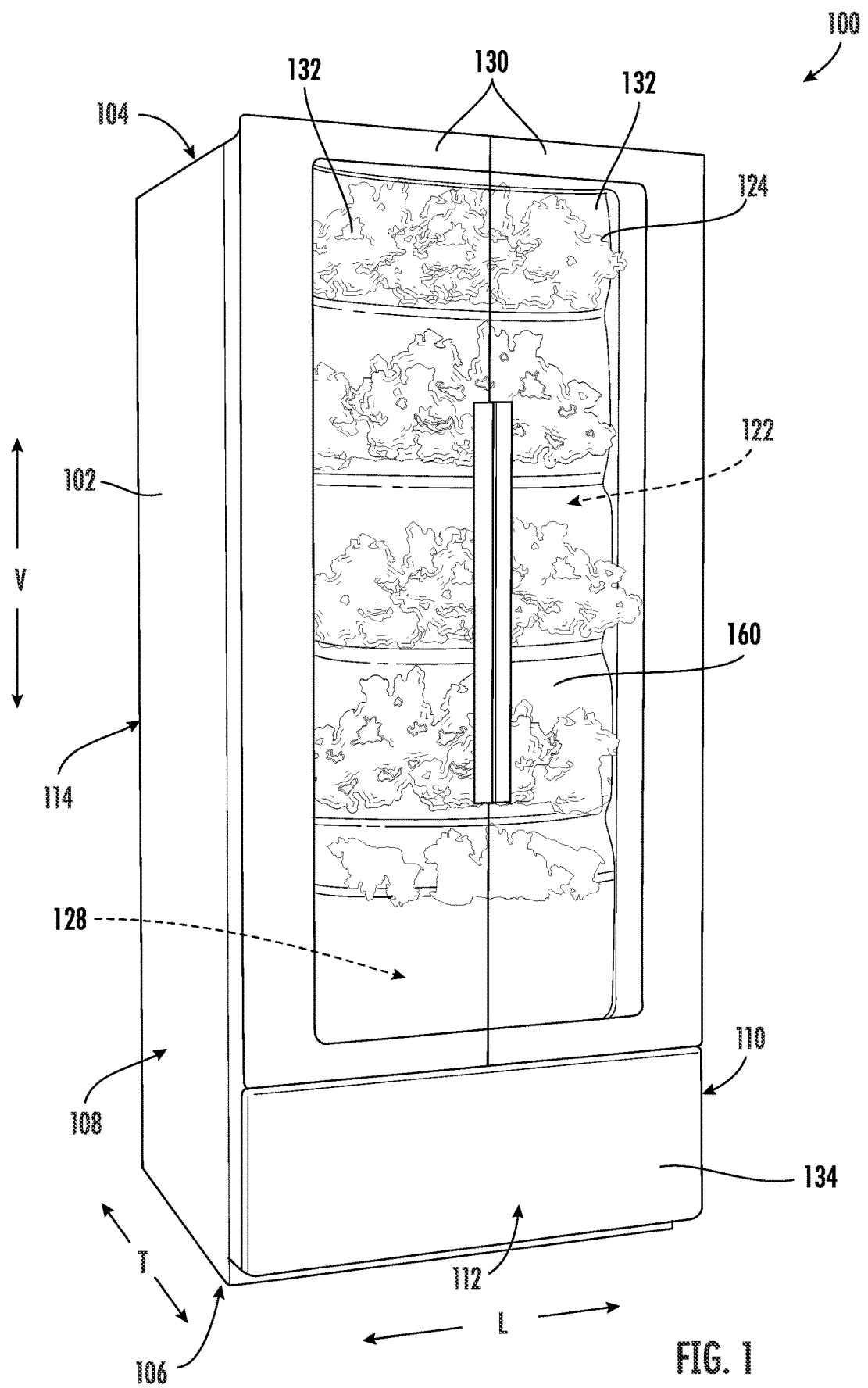
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, a gardening appliance 100 will be described in accordance with exemplary aspects of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

According to exemplary embodiments, gardening appliance 100 includes a cabinet 102 that is generally configured for containing and/or supporting various components of gardening appliance 100 and which may also define one or more internal chambers or compartments of gardening appliance 100. In this regard, as used herein, the terms "cabinet," "housing," and the like are generally intended to refer to an outer frame or support structure for gardening appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of gardening appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, gardening appliance 100 generally defines a vertical direction V, a lateral direction L, and a transverse direction T, each of which is mutually perpendicular, such that an orthogonal coordinate system is generally defined. The horizontal direction is generally intended to refer to a direction perpendicular to the vertical direction V (e.g., within a plane defined by the lateral direction L and the transverse direction T). Cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing gardening appliance 100.

Gardening appliance 100 may include an insulated liner 120 positioned within cabinet 102. Liner 120 may at least partially define an internal temperature-controlled chamber, referred to herein generally as a climate-controlled chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter in any manner.

Cabinet 102, or more specifically, liner 120 may define a substantially enclosed back portion 126 (e.g., proximate rear 114 of cabinet 102). In addition, cabinet 102 and liner 120 may define a front opening, referred to herein as front display opening 128 (e.g., proximate front 112 of cabinet 102), through which a user of gardening appliance 100 may access climate-controlled chamber 122, e.g., for harvesting, planting, pruning, or otherwise interacting with plants 124. According to an exemplary embodiment, enclosed back portion 126 may be defined as a portion of liner 120 that defines climate-controlled chamber 122 proximate rear side 114 of cabinet 102. In addition, front display opening 128 may generally be positioned proximate or coincide with front side 112 of cabinet 102.

Figure 2:
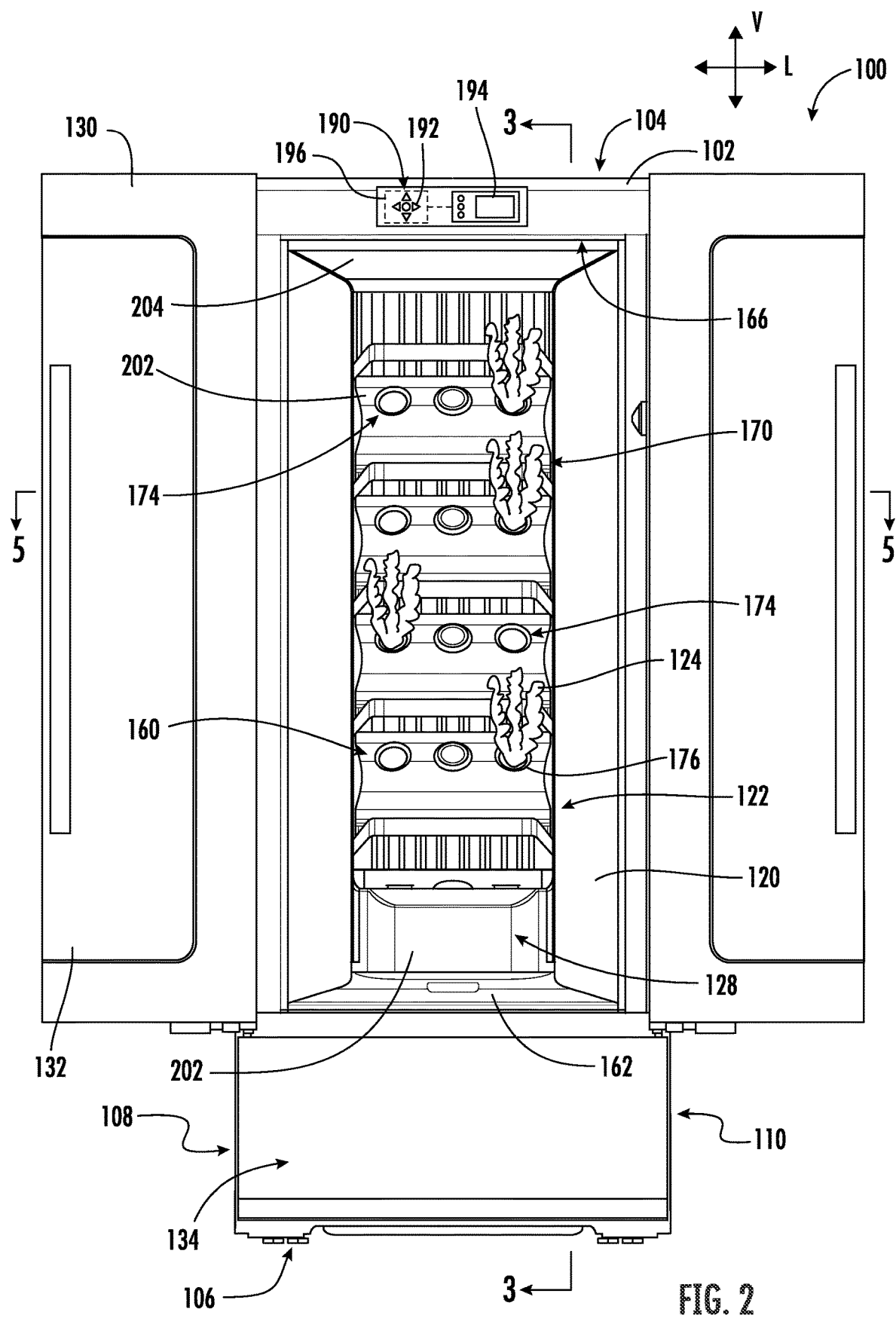
FIG. 2 depicts a front view of the exemplary gardening appliance of FIG. 1 with the doors open according to an exemplary embodiment of the present subject matter.

Gardening appliance 100 may further include one or more doors 130 that are rotatably mounted to cabinet 102 for providing selective access to climate-controlled chamber 122. For example, FIG. 1 illustrates doors 130 in the closed position such that they may help insulate climate-controlled chamber 122. By contrast, FIG. 2 illustrates doors 130 in the open positioned to permit access to climate-controlled chamber 122 and plants 124 stored therein. Doors 130 may further include a transparent window 132 through which a user may observe plants 124 without opening doors 130.

Although doors 130 are illustrated as being rectangular and being mounted on front side 112 of cabinet 102 in FIGS. 1 and 2, it should be appreciated that according to alternative embodiments, doors 130 may have different shapes, mounting locations, etc. For example, doors 130 may be curved, may be formed entirely from glass, etc. In addition, doors 130 may have integral features for controlling light passing into and/or out of climate-controlled chamber 122, such as internal louvers, tinting, UV treatments, polarization, etc. One skilled in the art will appreciate that other chamber and door configurations are possible and within the scope of the present subject matter.

According to the illustrated embodiment, cabinet 102 further defines a drawer 134 positioned proximate bottom 106 of cabinet 102 and being slidably mounted to cabinet 102 for providing convenient storage for plant nutrients, system accessories, water filters, etc. In addition, behind drawer 134 is a mechanical compartment 136 for receipt of an environmental control system including a sealed system for regulating the temperature within climate-controlled chamber 122, as described in more detail below.

Figure 3:
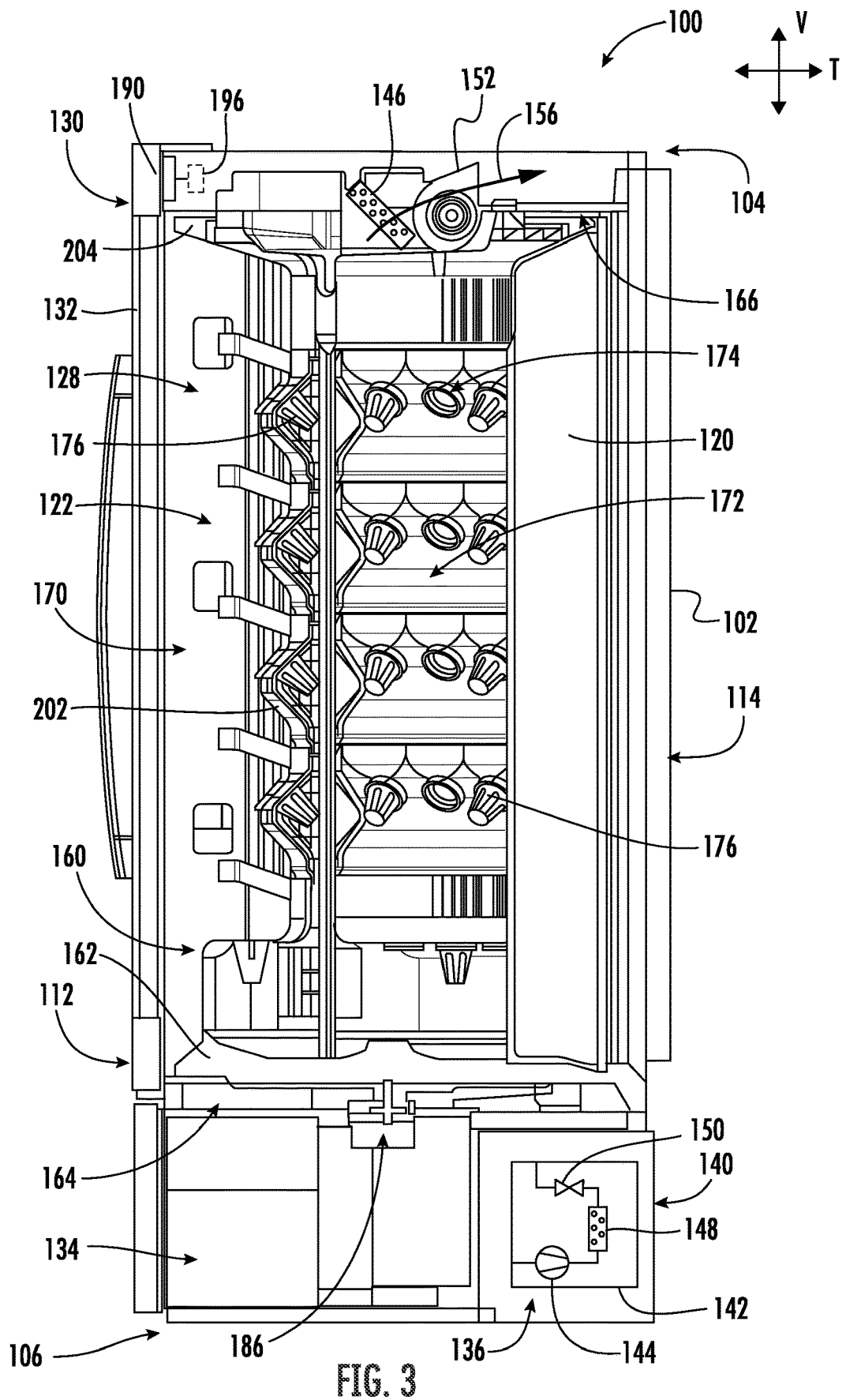
FIG. 3 is a cross sectional view of the exemplary gardening appliance of FIG. 1, taken along Line 3-3 from FIG. 2.

FIG. 3 provides a schematic view of certain components of an environmental control system 140 that may be used to regulate a climate or environment within climate-controlled chamber 122. Specifically, environmental control system 140 may include one or more subsystems for regulating temperature, humidity, hydration, nutrient dosing, lighting, and any other aspects of the environment within one or more portions of climate-controlled chamber 122, e.g., as desired to facilitate improved or regulated growth of plants 124 positioned therein. Although exemplary subsystems and subsystem configurations are described below, it should be appreciated that aspects of environmental control system 140 may vary while remaining within the scope of the present subject matter.

As illustrated, environmental control system 140 includes a sealed system 142 that is generally configured for regulating a temperature and/or humidity within one or more regions of climate-controlled chamber 122. In this regard, as shown schematically in FIG. 3, sealed system 142 may be located partially within mechanical compartment 136 and includes a compressor 144, a first heat exchanger or evaporator 146 and a second heat exchanger or condenser 148. As is generally understood, compressor 144 is generally operable to circulate or urge a flow of refrigerant through sealed system 142, which may include various conduits which may be utilized to flow refrigerant between the various components of sealed system 142. Thus, evaporator 146 and condenser 148 may be between and in fluid communication with each other and compressor 144.

During operation of sealed system 142, refrigerant flows from evaporator 146 and to compressor 144. For example, refrigerant may exit evaporator 146 as a fluid in the form of a superheated vapor. Upon exiting evaporator 146, the refrigerant may enter compressor 144, which is operable to compress the refrigerant and direct the compressed refrigerant to condenser 148. Accordingly, the pressure and temperature of the refrigerant may be increased in compressor 144 such that the refrigerant becomes a more superheated vapor.

Condenser 148 is disposed downstream of compressor 144 and is operable to reject heat from the refrigerant. For example, the superheated vapor from compressor 144 may enter condenser 148 and transfer energy to air surrounding condenser 148 (e.g., to create a flow of heated air). In this manner, the refrigerant condenses into a saturated liquid and/or liquid vapor mixture. A condenser fan (not shown) may be positioned adjacent condenser 148 and may facilitate or urge the flow of heated air across the coils of condenser 148 (e.g., from ambient atmosphere) in order to facilitate heat transfer.

According to the illustrated embodiment, an expansion device or a variable electronic expansion valve 150 may be further provided to regulate refrigerant expansion. During use, variable electronic expansion valve 150 may generally expand the refrigerant, lowering the pressure and temperature thereof. In this regard, refrigerant may exit condenser 148 in the form of high liquid quality/saturated liquid vapor mixture and travel through variable electronic expansion valve 150 before flowing through evaporator 146. Variable electronic expansion valve 150 is generally configured to be adjustable, e.g., such that the flow of refrigerant (e.g., volumetric flow rate in milliliters per second) through variable electronic expansion valve 150 may be selectively varied or adjusted.

Evaporator 146 is disposed downstream of variable electronic expansion valve 150 and is operable to heat refrigerant within evaporator 146, e.g., by absorbing thermal energy from air surrounding the evaporator (e.g., to create a flow of cooled air). For example, the liquid or liquid vapor mixture refrigerant from variable electronic expansion valve 150 may enter evaporator 146. Within evaporator 146, the refrigerant from variable electronic expansion valve 150 receives energy from the flow of cooled air and vaporizes into superheated vapor and/or high-quality vapor mixture. An air handler or evaporator fan 152 is positioned adjacent evaporator 146 and may facilitate or urge the flow of cooled air across evaporator 146 in order to facilitate heat transfer. From evaporator 146, refrigerant may return to compressor 144 and the vapor-compression cycle may continue.

As explained above, environmental control system 140 includes a sealed system 142 for providing a flow of heated air or a flow cooled air throughout climate-controlled chamber 122 as needed. To direct this air, environmental control system 140 may include a duct system 154 for directing the flow of temperature regulated air, identified herein simply as flow of air 156 (see, e.g., FIG. 3). In this regard, for example, evaporator fan 152 can generate a flow of cooled air as the air passes over evaporator 146 and a condenser fan (not shown) can generate a flow of heated air as the air passes over condenser 148.

This temperature-regulated flow of air 156 may be routed through a cooled air supply duct and/or heated air may be routed through a heated air supply duct (not shown). In this regard, it should be appreciated that environmental control system 140 may generally include a plurality of ducts, dampers, diverter assemblies, and/or air handlers to facilitate operation in a cooling mode, in a heating mode, in both a heating and cooling mode, or any other mode suitable for regulating the environment within climate-controlled chamber 122. It should be appreciated that duct system 154 may vary in complexity and may regulate the flows of air from sealed system 142 in any suitable arrangement through any suitable portion of climate-controlled chamber 122.

Although an exemplary sealed system 142 and duct system 154 are illustrated and described herein, it should be appreciated that variations and modifications may be made to sealed system 142 and/or duct system 154 while remaining within the scope of the present subject matter. For example, sealed system 142 may include additional or alternative components, duct system 154 may include additional or different ducting configurations, etc. For example, according to the illustrated embodiment, evaporator 146 and evaporator fan 152 may be positioned at top 104 of cabinet 102 and refrigerant may be routed from mechanical compartment 136 and through cabinet 102 to evaporator 146. In addition, it should be appreciated that gardening appliance 100 may have one or more subsystems integrated with or operably coupled to duct system 154 for filtering the flow of air 156, regulating the concentration of one or more gases within the flow of air 156, etc.

Referring now generally to FIGS. 1 through 7, gardening appliance 100 generally includes a rotatable carousel, referred to herein as a grow tower 160 that is mounted within liner 120, e.g., such that it is within climate-controlled chamber 122. More specifically, grow tower 160 may be positioned on top of a turntable 162 that is rotatably mounted to a sump 164 of gardening appliance 100. In general, grow tower 160 extends along the vertical direction V from sump 164 to a top wall 166 of climate-controlled chamber 122.

In addition, grow tower 160 is generally rotatable about a central axis 168 defined by turntable 162. Specifically, according to the illustrated embodiment, central axis 168 is parallel to the vertical direction V. However, it should be appreciated that central axis 168 could alternatively extend in any suitable direction, e.g., such as the horizontal direction (e.g., defined by the lateral direction L and the transverse direction T). In this regard, grow tower 160 generally defines an axial direction A, i.e., parallel to central axis 168, a radial direction R that extends perpendicular to central axis 168, and a circumferential direction C that extends around central axis 168 (e.g., in a plane perpendicular to central axis 168).

As illustrated, grow tower 160 may generally separate, divide, or partition climate-controlled chamber 122 into a plurality of grow chambers (e.g., identified generally by reference numeral 170). More specifically, grow chambers 170 are generally defined between grow tower 160 and liner 120 or between grow tower 160 and doors 130. In general, grow chambers 170 are intended to support the leafy growth of plants 124 (e.g., or other portions of plants 124 other than the plant roots). According to the illustrated embodiment, grow tower 160 divides climate control chamber 122 into three grow chambers 170, referred to herein generally as a first chamber, a second chamber, and a third chamber. As illustrated, these grow chambers 170 are circumferentially spaced relative to each other and define substantially separate and distinct growing environments. As such, each grow chamber 170 may receive plants 124 having different growth needs and the grow environment within each respective grow chamber 170 may be maintained as grow tower 160 is rotated within climate-controlled chamber 122.

In addition, according to the illustrated embodiment, grow tower 160 may generally define an internal chamber, referred to herein as a root chamber 172. In general, root chamber 172 may be substantially sealed relative to (or isolated from) grow chambers 170 and is configured for containing the roots of plants 124 throughout the growing process. As will be described in more detail below, grow tower 160 may generally define one or more apertures 174 that are defined through grow tower 160 to permit access between grow chambers 170 and root chamber 172. According to exemplary embodiments, these apertures 174 may be configured to receive plant pods 176 into root chamber 172.

Plant pods 176 generally contain seedlings, root balls, or other plant material for growing plants 124 positioned within a mesh or other support structure through which roots of plants 124 may grow within grow tower 160. A user may insert a portion of plant pod 176 (e.g., a seed end or root end) having the desired seeds through one of the plurality of apertures 174 into root chamber 172. A plant end (e.g., opposite the root end) of the plant pod 176 may remain within grow chamber 170 such that plants 124 may grow from grow tower 160 such that they are accessible by a user.

As will be explained below, water and other nutrients may be supplied to the root end of plant pods 176 within root chamber 172. For example, according to the illustrated embodiment, root chamber 172 may be operably coupled with sealed system 142 for facilitating suitable climate control within the root chamber 172, e.g., to achieve desirable growing conditions. Similarly, a hydration system may be configured to provide a flow of hydrating mist including water, nutrients, and other suitable constituents for providing the desirable growth environment for plants 124. According to exemplary embodiments, apertures 174 may be covered by a flat flapper seal or seal cap (not shown) to prevent hydrating mist from escaping root chamber 172 when no plant pod 176 is installed and to facilitate improved climate control within root chamber 172 and grow chambers 170.

Although grow tower 160 described and illustrated above includes a single root chamber 172, it should be appreciated that according to alternative exemplary embodiments, grow tower 160 may further include one or more internal dividers (not shown) that are positioned within root chamber 172 to divide root chamber 172 into a plurality of sub-chambers or root chambers. Each of these root chambers may be partially or substantially isolated from the other root chambers to facilitate independent climate control, hydration, gas regulation, etc. In addition, each of these root chambers may be in fluid communication with one of the plurality of grow chambers 170 through the plurality of apertures 174.

Notably, it may be desirable according to exemplary embodiments to form a fluid-tight seal between the grow tower 160 and liner 120. In this manner, as grow tower 160 rotates within climate-controlled chamber 122, grow chambers 170 may remain fluidly isolated from each other. Therefore, according to an exemplary embodiment, grow tower 160 may generally define a grow module diameter (e.g., defined by its substantially circular footprint formed in a horizontal plane). Similarly, enclosed back portion 126 of liner 120 may be substantially cylindrical and may define a liner diameter (not labeled). In order to prevent a significant amount of air from escaping between grow tower 160 and liner 120, and in order to fluidly isolate the various grow chambers 170, the liner diameter may be substantially equal to or slightly larger than the grow module diameter.

Figure 7:
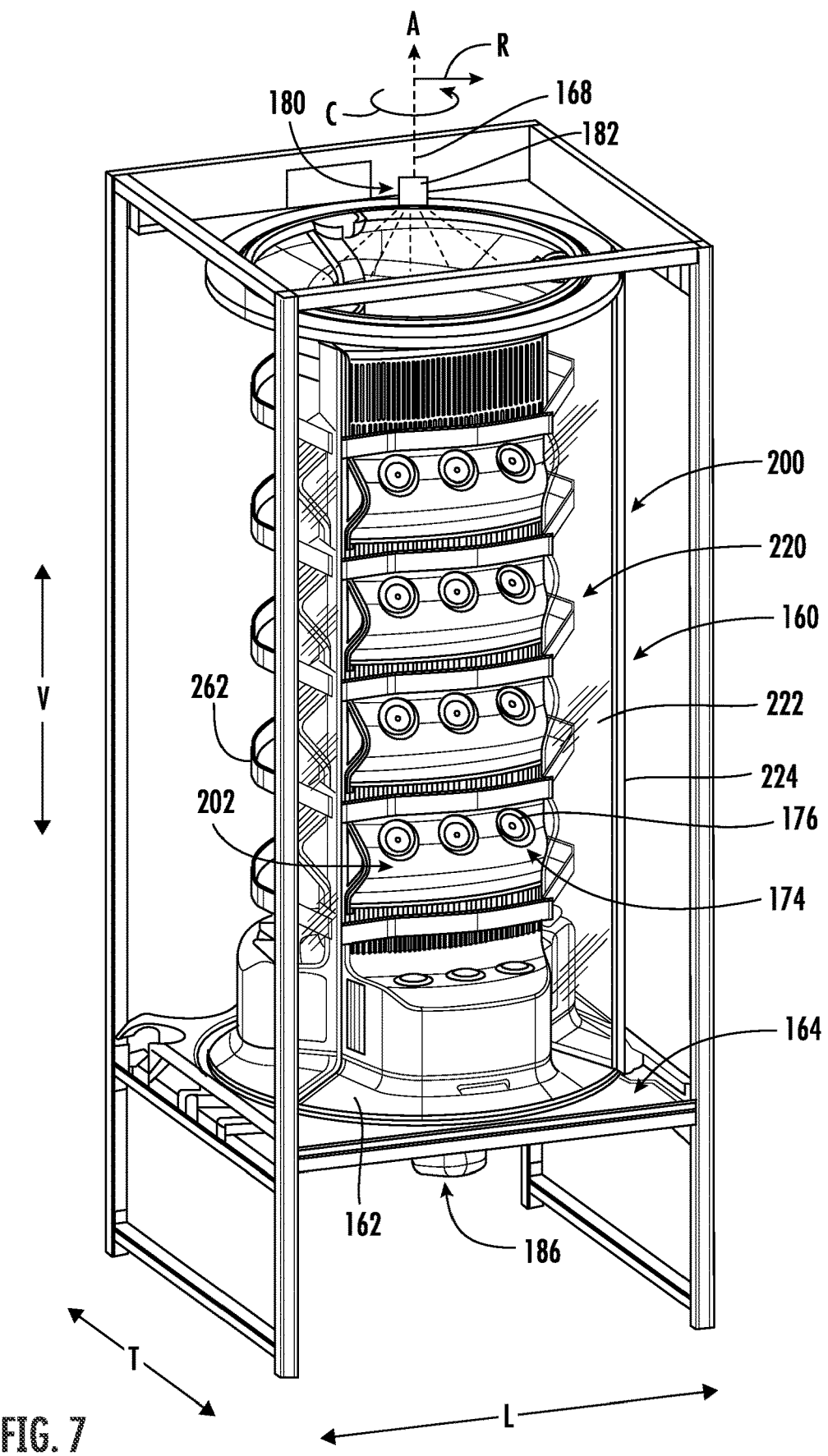
FIG. 7 provide a perspective view of a grow tower of the exemplary gardening appliance of FIG. 1 according to an exemplary embodiment of the present subject matter.
Figure 8:
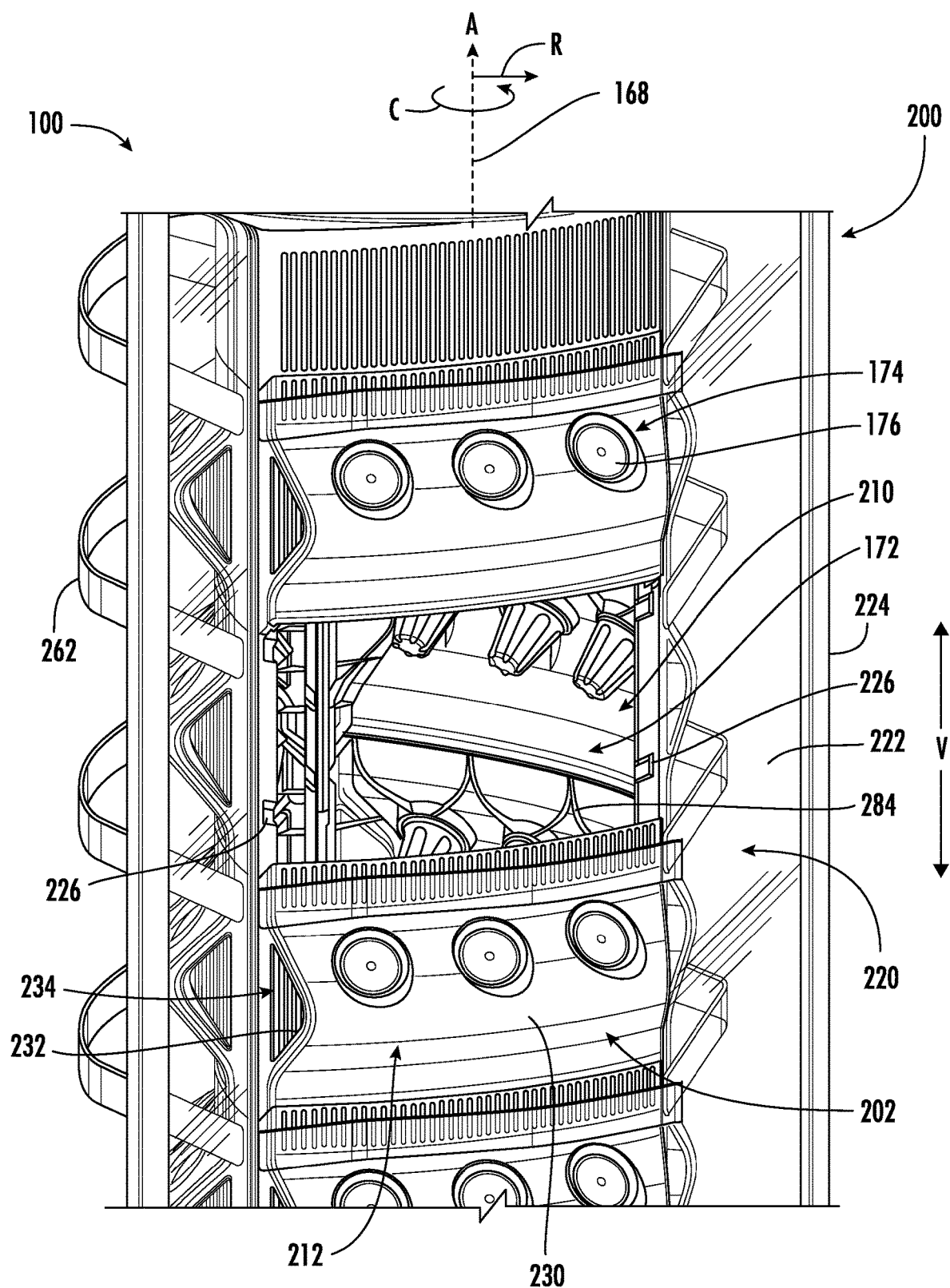
FIG. 8 provides a perspective view of the exemplary grow tower of FIG. 7 with a grow module removed to reveal an internal root chamber according to an exemplary embodiment of the present subject matter.
Figure 9:
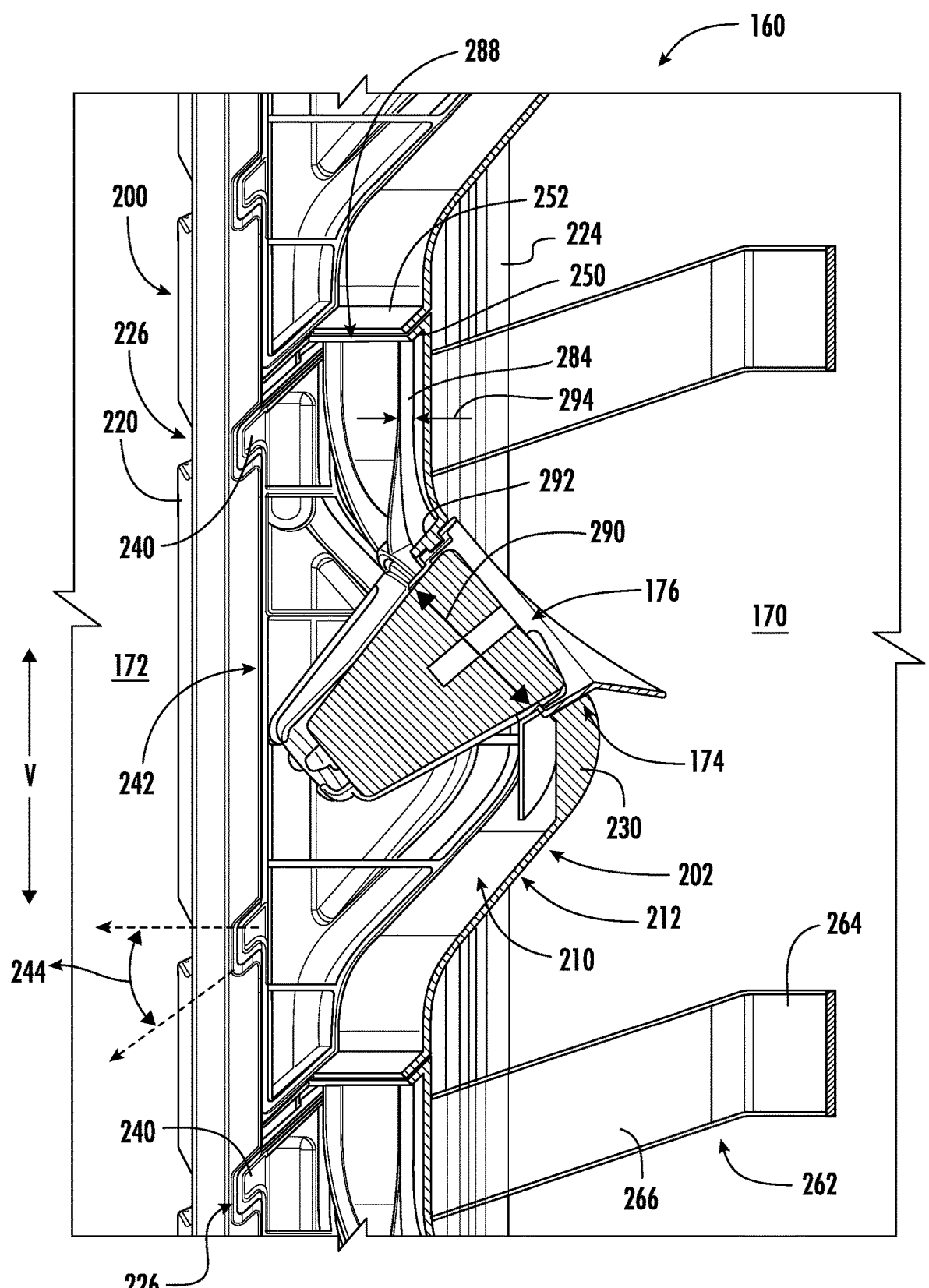
FIG. 9 provides a cross-sectional view of the exemplary grow tower of FIG. 7 according to an exemplary embodiment of the present subject matter.

As best shown in FIG. 7, environmental control system 140 may further include a hydration system 180 which is generally configured for providing water and/or nutrients to plants 124 to support their growth. Specifically, according to the illustrated embodiment, hydration system 180 may be fluidly coupled to a water supply and or nutrient distribution assembly to selectively provide desirable quantities and concentrations of hydration, nutrients, and/or other fluids onto plants 124 to facilitate improved plant growth. For example, hydration system 180 includes misting device 182 (e.g., such as a fine mist spray nozzle or nozzles) that is fluidly coupled to a water supply (not shown). For example, the water supply may be a reservoir containing water (e.g., distilled water) or may be a direct connection municipal water supply. According to exemplary embodiments, hydration system 180 may include one or more pumps (not shown) for providing a flow of liquid nutrients to misting device 182. In this regard, for example, water or nutrients that are not absorbed by roots of plants 124 may fall under the force of gravity into sump 164 and these pumps may be fluidly coupled to sump 164 to recirculate the water through misting device 182.

According to the illustrated embodiment, misting device 182 is positioned at a top of root chamber 172 and may be configured for charging root chamber 172 with mist for hydrating the roots of plants 124. Alternatively, misting devices 182 may be positioned at a bottom of root chamber 172 (e.g., within sump 164) for spraying a mist or water into root chamber 172. Because various plants 124 may require different amounts of water for desired growth, hydration system 180 may alternatively include a plurality of misting devices 182, e.g., all coupled to the water supply and/or nutrient supplies. This plurality of misting devices 182 may be spaced apart at along the vertical direction V within root chamber 172. In this manner, these misting devices 182 may provide different concentrations of hydration and/or nutrients to different regions within root chamber 172.

Notably, environmental control system 140 described above is generally configured for regulating the temperature and humidity (e.g., or some other suitable water level quantity or measurement) within one or all of the plurality of chambers 170 and/or root chambers 172 independently of each other. In this manner, a versatile and desirable growing environment may be obtained for each and every chamber 170.

Figure 5:
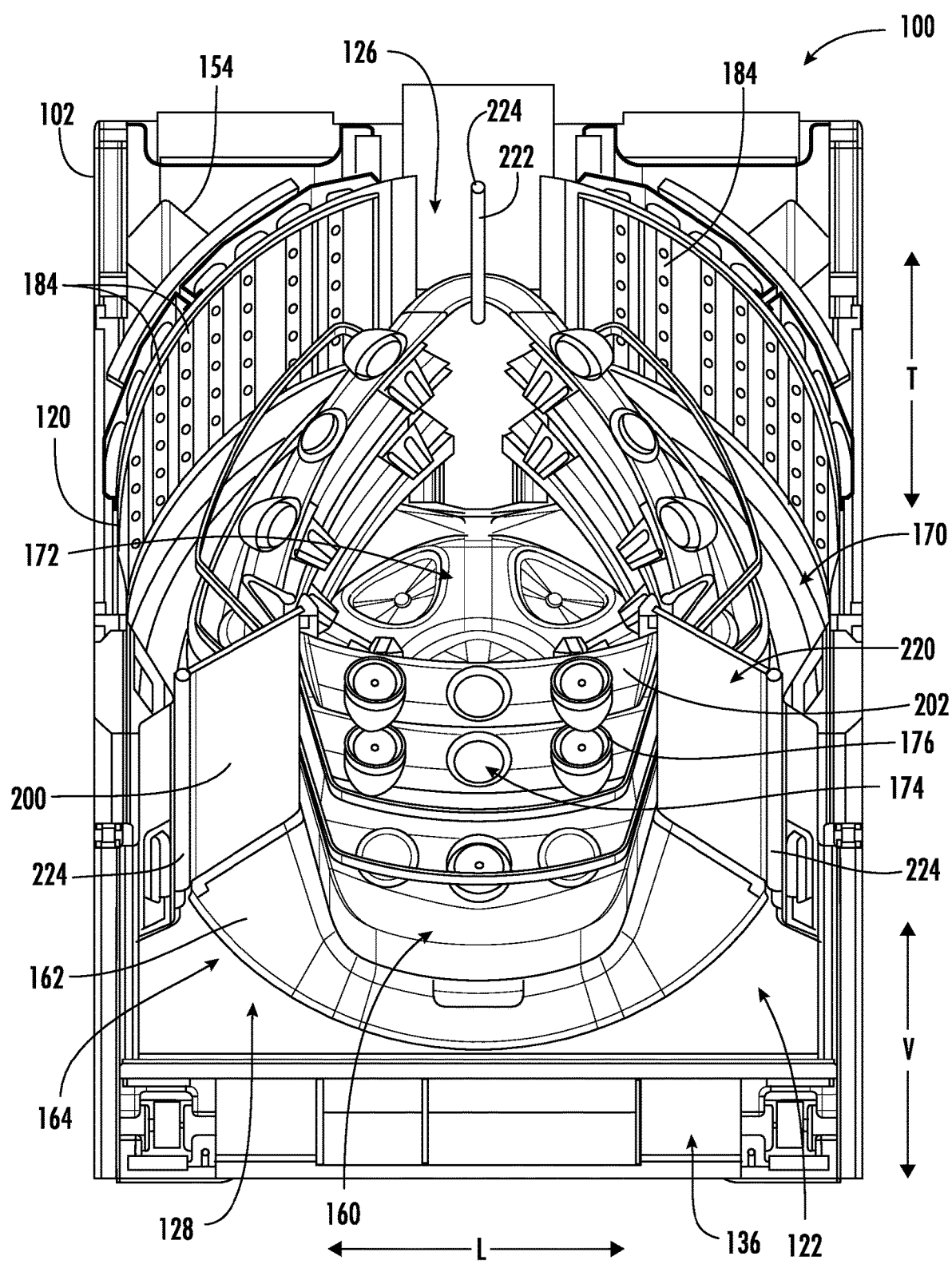
FIG. 5 is a perspective cross-sectional view of the exemplary gardening appliance of FIG. 1, taken along Line 5-5 from FIG. 2.
Figure 6:
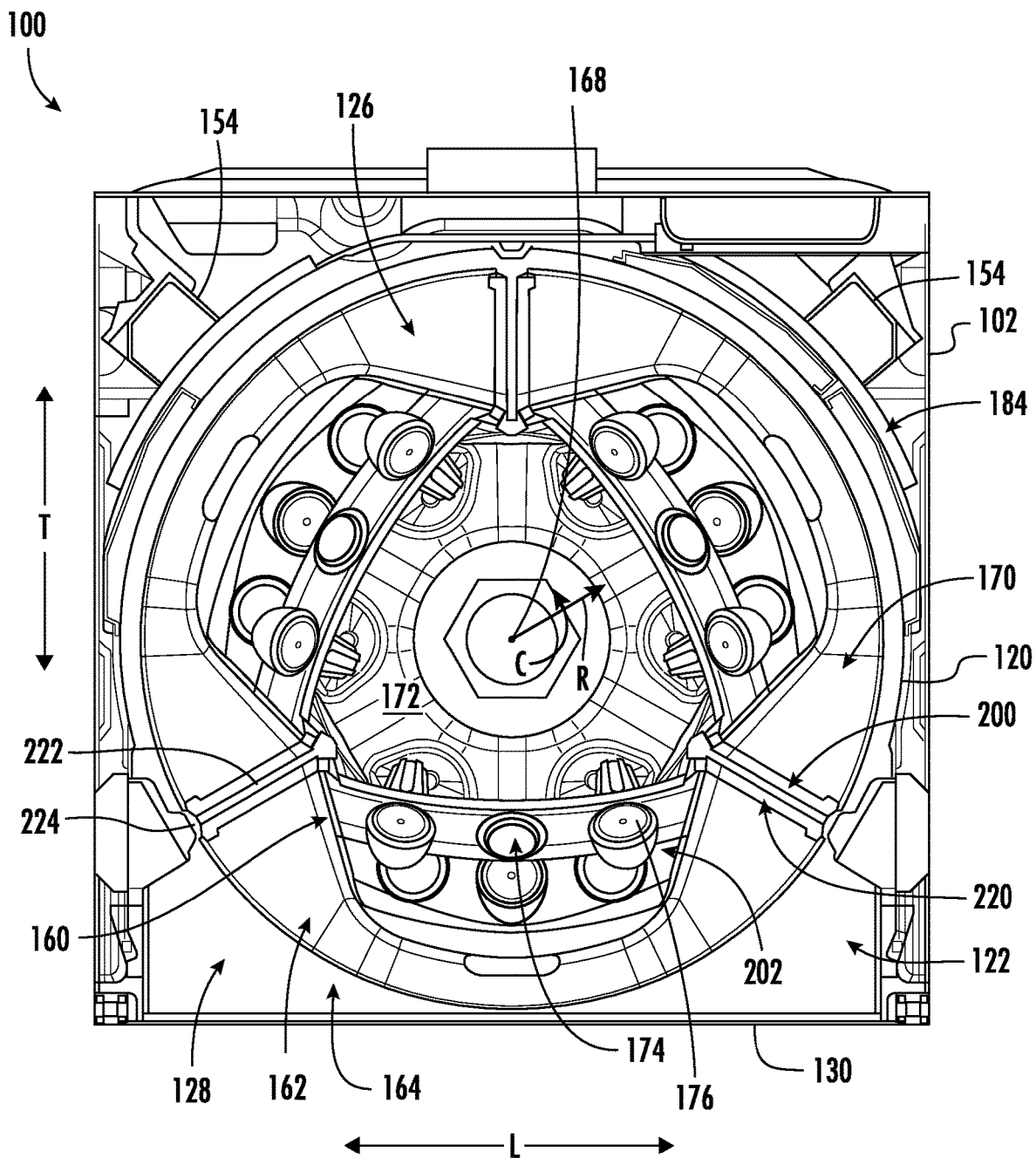
FIG. 6 is a top cross-sectional view of the exemplary gardening appliance of FIG. 1, taken along Line 5-5 from FIG. 2.

Referring now for example to FIGS. 5 and 6, gardening appliance 100 may further include a light assembly 184 which is generally configured for providing light into selected grow chambers 170 to facilitate photosynthesis and growth of plants 124. As shown, light assembly 184 may include a plurality of light sources (not labeled) stacked in an array, e.g., extending along the vertical direction V. For example, light assembly 184 may be mounted directly to liner 120 within climate-controlled chamber 122 or may alternatively be positioned behind liner 120 such that light is projected through a transparent window or light pipe into climate-controlled chamber 122. The position, configuration, and type of light sources described herein are not intended to limit the scope of the present subject matter in any manner.

Light assembly 184 may include any suitable number, type, position, and configuration of electrical light source(s), using any suitable light technology and illuminating in any suitable color. For example, according to the illustrated embodiment, light assembly 184 includes one or more light emitting diodes (LEDs), which may each illuminate in a single color (e.g., white LEDs), or which may each illuminate in multiple colors (e.g., multi-color or RGB LEDs) depending on the control signal from controller 196. However, it should be appreciated that according to alternative embodiments, light assembly 184 may include any other suitable traditional light bulbs or sources, such as halogen bulbs, fluorescent bulbs, incandescent bulbs, glow bars, a fiber light source, etc.

As explained above, light generated from light assembly 184 may result in light pollution within a room where gardening appliance 100 is located. Therefore, aspects of the present subject matter are directed to features for reducing light pollution, or to the blocking of light from light assembly 184 through front display opening 128. Specifically, as illustrated, light assembly 184 is positioned only within the enclosed back portion 126 of liner 120 such that only grow chambers 170 which are in a sealed position are exposed to light from light assembly 184. Specifically, grow tower 160 acts as a physical partition between light assemblies 184 and front display opening 128. In this manner, as illustrated in FIG. 5, no light may pass from the first or second grow chambers 170 (i.e., the "rear" or enclosed grow chambers 170) through grow tower 160 and out through front display opening 128. As grow tower 160 rotates, two of the three grow chambers 170 will receive light from light assembly 184 at a time. According to still other embodiments, a single light assembly may be used to reduce costs, whereby only a single grow chamber 170 will be illuminated at a single time.

Referring now specifically to FIGS. 3 and 7, gardening appliance 100 may further include a motor assembly 186 or another suitable driving element or device for selectively rotating grow tower 160 during operation of gardening appliance 100. In this regard, according to the illustrated embodiment, motor assembly 186 is positioned below grow tower 160, e.g., within mechanical compartment 136, and may be mechanically coupled to turntable 162 for selectively rotating turntable 162 and grow tower 160 about central axis 168.

As used herein, "motor" may refer to any suitable drive motor and/or transmission assembly for rotating turntable 162 and grow tower 160. For example, motor assembly 186 may include a brushless DC electric motor, a stepper motor, or any other suitable type or configuration of motor. For example, motor assembly 186 may include an AC motor, an induction motor, a permanent magnet synchronous motor, or any other suitable type of AC motor. In addition, motor assembly 186 may include any suitable transmission assemblies, clutch mechanisms, or other components.

Referring again to FIG. 2, gardening appliance 100 may include a control panel 190 that may represent a general-purpose Input/Output ("GPIO") device or functional block for gardening appliance 100. In some embodiments, control panel 190 may include or be in operative communication with one or more user input devices 192, such as one or more of a variety of digital, analog, electrical, mechanical, or electro-mechanical input devices including rotary dials, control knobs, push buttons, toggle switches, selector switches, and touch pads.

Additionally, gardening appliance 100 may include a display 194, such as a digital or analog display device generally configured to provide visual feedback regarding the operation of gardening appliance 100. For example, display 194 may be provided on control panel 190 and may include one or more status lights, screens, or visible indicators. According to exemplary embodiments, user input devices 192 and display 194 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Gardening appliance 100 may further include or be in operative communication with a processing device or a controller 196 that may be generally configured to facilitate appliance operation. In this regard, control panel 190, user input devices 192, and display 194 may be in communication with controller 196 such that controller 196 may receive control inputs from user input devices 192, may display information using display 194, and may otherwise regulate operation of gardening appliance 100. For example, signals generated by controller 196 may operate gardening appliance 100, including any or all system components, subsystems, or interconnected devices, in response to the position of user input devices 192 and other control commands. Control panel 190 and other components of gardening appliance 100 may be in communication with controller 196 via, for example, one or more signal lines or shared communication busses. In this manner, Input/Output ("I/O") signals may be routed between controller 196 and various operational components of gardening appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 196 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 196 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 196 may be operable to execute programming instructions or micro-control code associated with an operating cycle of gardening appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 196 as disclosed herein is capable of and may be operable to perform any methods, method steps, or portions of methods as disclosed herein. For example, in some embodiments, methods disclosed herein may be embodied in programming instructions stored in the memory and executed by controller 196.

The memory devices may also store data that can be retrieved, manipulated, created, or stored by the one or more processors or portions of controller 196. The data can include, for instance, data to facilitate performance of methods described herein. The data can be stored locally (e.g., on controller 196) in one or more databases and/or may be split up so that the data is stored in multiple locations. In addition, or alternatively, the one or more database(s) can be connected to controller 196 through any suitable network(s), such as through a high bandwidth local area network (LAN) or wide area network (WAN). In this regard, for example, controller 196 may further include a communication module or interface that may be used to communicate with one or more other component(s) of gardening appliance 100, controller 196, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

According to an exemplary embodiment, motor assembly 186 may be operably coupled to controller 196, which is programmed to rotate grow tower 160 according to predetermined operating cycles, based on user inputs (e.g., via touch buttons 192), etc. In addition, controller 196 may be communicatively coupled to one or more sensors, such as temperature or humidity sensors, positioned within the various chambers 170 for measuring temperatures and/or humidity, respectively. Controller 196 may then operate motor assembly 186 in order to maintain desired environmental conditions for each of the respective chambers 170. For example, as described herein, gardening appliance 100 includes features or subsystems for providing certain locations of gardening appliance 100 with light, temperature control, proper moisture, nutrients, and other requirements for suitable plant growth. Motor assembly 186 may be used to position specific chambers 170 where needed to receive such growth requirements.

According to an exemplary embodiment, such as where grow tower 160 divides climate-controlled chamber 122 into three grow chambers 170, controller 196 may operate motor assembly 186 to index grow tower 160 sequentially through a number of preselected positions. More specifically, motor assembly 186 may rotate grow tower 160 in a counterclockwise direction (e.g., when viewed from a top of grow tower 160) in 120° increments to move chambers 170 between sealed positions and display positions. As used herein, a chamber 170 is considered to be in a "sealed position" when that chamber 170 is substantially sealed between grow tower 160 and liner 120. By contrast, a chamber 170 is considered to be in a "display position" when that chamber 170 is at least partially exposed to front display opening 128, such that a user may access plants 124 positioned within that chamber 170.

Figure 4:
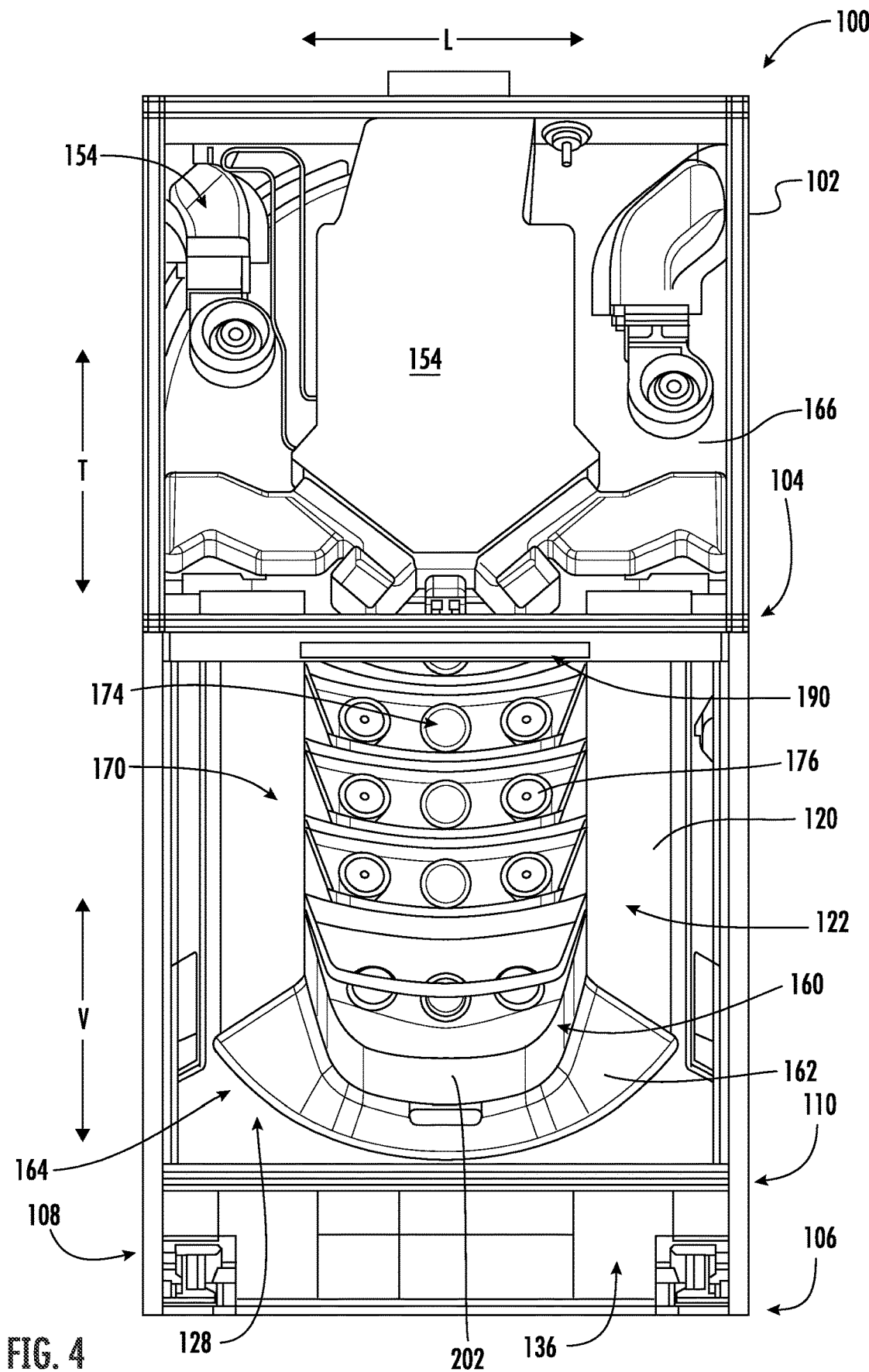
FIG. 4 is a top perspective view of the exemplary gardening appliance of FIG. 1, with a top panel and doors removed according to an exemplary embodiment of the present subject matter.

For example, as illustrated in FIGS. 4 and 5, the first grow chamber and the second grow chamber (i.e., the rear chambers) are both in a sealed position, whereas the third grow chamber (i.e., the front chamber) is in a display position. As motor assembly 186 rotates grow tower 160 by 120 degrees in the counterclockwise direction, the second grow chamber will enter the display position, while the first grow chamber and the third grow chamber will be in the sealed positions. Motor assembly 186 may continue to rotate grow tower 160 in such increments to cycle grow chambers 170 between these sealed and display positions.

Gardening appliance 100 and grow tower 160 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow tower 160 that divides the climate-controlled chamber 122 in half to define a first grow chamber and a second grow chamber. According to such an embodiment, by rotating grow tower 160 by 180 degrees about central axis 168, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow tower 160 but may have a modified cabinet 102 such that front display opening 128 is wider and two of the three grow chambers 170 are displayed at a single time. Thus, the first grow chamber may be in the sealed position, while the second grow chamber and the third grow chamber may be in the display positions. As grow tower 160 is rotated counterclockwise, the first grow chamber is moved into the display position and the third grow chamber is moved into the sealed position.

Referring now to generally to FIGS. 1 through 16, grow tower 160 will be described in more detail according to an exemplary embodiment of the present subject matter. Although an exemplary embodiment of grow tower 160 is described herein, it should be appreciated that variations and modifications may be made to grow tower 160 while remaining within the scope of the present subject matter. In addition, it should be appreciated that grow tower 160 is not limited to the exemplary application described herein. Indeed, grow tower 160 may be used within any gardening appliance.

As explained above, grow tower 160 may be mounted within climate-controlled chamber 122 such that it is rotatable about central axis 168. More specifically, grow tower 160 may be seated on turntable 162 that is rotatably mounted to sump 164 and which is driven by motor assembly 186 to facilitate precise positioning of grow tower 160. Grow tower 160 may generally define an axial direction A (e.g., which may be parallel to the vertical direction V), a radial direction R, and a circumferential direction C.

As best shown in FIG. 7, grow tower 160 may generally include a module support frame 200 that is generally configured for supporting a plurality of grow modules 202 within climate-controlled chamber 122. More specifically, module support frame 200 may generally extend along the vertical direction V from turntable 162 to a top bearing 204 that permits rotation of grow tower 160 about central axis 168. In this regard, top bearing 204 may generally be rotatably mounted to a top wall 166 of climate-controlled chamber 122 to facilitate free rotation of grow tower 160 at its top end. In this manner, motor assembly 186 may drive turntable 162 and grow tower 160 may rotate without binding or excessive friction at a top of grow tower 160.

As illustrated herein, module support frame 200 and the plurality of grow module 202 mounted thereon generally define root chamber 172 and partially define grow chambers 170. More specifically, grow modules 202 may generally define an inner surface 210 that faces root chamber 172 and that defines the boundaries of root chamber 172. In addition, each grow module 202 may define an outer surface 212 that faces grow chambers 170 and at least partially defines the boundaries of grow chambers 170 and may be visible to a user of gardening appliance 100. Although the exemplary illustrated embodiment illustrates two types of grow modules 202 (e.g., a base grow module and a plurality of vertically stacked grow modules), it should be appreciated that the types of grow modules mounted to module support frame 200 may vary while remaining within scope the present subject matter.

Referring still to FIG. 7, module support frame 200 includes a plurality of vertical support members 220 that extend between turntable 162 and top bearing 204 to provide structural rigidity to grow tower 160. More specifically, an exemplary module support frame 200 includes three vertical support members 220 that are spaced apart about the circumferential direction C and extend at least partially along the radial direction R toward liner 120 of gardening appliance 100. According to exemplary embodiments, each of the vertical support members 220 may include a panel, such as an acrylic panel 222, that extends outward along the radial direction R and a sealing element 224 (e.g., such as a bulb seal or resilient wiper) mounted to a radially distal end of acrylic panel 222 for forming a fluid seal with liner 120. In this manner, as grow tower 160 rotates within liner 120, sealing elements 224 may maintain substantially isolated grow chambers 170.

Module support frame 200 may generally provide vertical support for some or all of grow modules 202 within grow tower 160. In this regard, for example, each of the plurality of vertical support members 220 may define a plurality of mounting slots 226. As will be explained in more detail below, mounting slots 226 may generally be configured for receiving and supporting grow modules 202. As illustrated, mounting slots 226 may be spaced apart along the vertical direction V to define a plurality of mounting positions for grow modules 202. In this manner, grow tower 160 may include a plurality of grow modules 202 that are stacked together and mounted to the vertical support members 202. The mounting slots 226 and corresponding features on grow module 202 may be sized and positioned such that stacking grow modules 202 in this manner defines a substantially sealed root chamber 172, e.g., such that independent climate control may be maintained between root chamber 172 and each of the plurality of grow chambers 170.

As noted above, grow modules 202 may generally define a plurality of apertures 174 that are configured for receiving plant pods 176. These apertures 174 may extend from outer surface 212 through grow module 202 to inner surface 210. In order to maintain a substantially sealed root chamber 172, it may be desirable to prevent or restrict fluid communication between root chamber 172 and grow chambers 170 through apertures 174. Accordingly, when a plant pod 176 is not positioned within an aperture 174, aperture 174 may be substantially sealed with another structure, such as a flapper seal, a removable seal cap, or another suitable component for substantially sealing apertures 174.

Referring now generally to FIGS. 8 through 12, each grow module 202 may generally include a support body 230 and one or more side supports 232 that are connected to support body 230 and are generally configured for engaging the vertical support members 220. More specifically, as illustrated, support body 230 may be the portion of grow module 202 that defines apertures 174. According to the illustrated embodiment, support body 230 is curved, e.g., to provide the desired support for plant pods 176. More specifically, outer surface 212 of support body 230 may be convex when viewed from outside root chamber 172. By contrast, it should be appreciated that according to alternative embodiments, outer surface 212 of support body 230 may be concave when viewed from outside root chamber 172 or may have any other suitable shape or profile.

According to the illustrated embodiment, each grow module 202 includes two side supports 232 that are positioned on opposite lateral ends of support body 230. In this regard, for example, support body 230 may generally extend along the circumferential direction C between adjacent vertical support members 220. By contrast, side supports 232 may generally extend inward from support body 230 along the radial direction R toward vertical support members 220. According to exemplary embodiments, grow module 202 may further define one or more handles or grip surfaces 234 that are defined within or on each of the side supports 232. In this manner, a user may quickly and easily grasp and remove grow modules 202 from grow tower 160, e.g., during harvesting or pruning process.

As explained above, module support frame 200 may define a plurality of mounting slots 226 for receiving grow module 202. Accordingly, grow module 202 may generally include a plurality of mounting tabs 240 that are generally configured for receipt within mounting slots 226 of vertical support members 220 to removably mount grow modules 202 to module support frame 200. More specifically, according to the illustrated embodiment, the plurality of mounting tabs 240 may extend from an engaging surface 242 of side supports 232 of each grow module 202. In this manner, grow module 202 may be mounted to the vertical support members 220 by inserting mounting tabs 240 into mounting slots 226 such that engaging surface 242 of each side support 232 is seated firmly against vertical support members 220.

As noted above, mounting tabs 240 and mounting slots 226 are generally complementary to each other facilitate secure engagement between grow modules 202 and module support frame 200. In addition, these mounting features may be uniform at each position on grow module 202 and module support frame 200 to facilitate improved modularity and interchangeability of grow modules 202. Although mounting slots 226 and mounting tabs 240 are illustrated as being substantially uniform or linear, it should be appreciated that the size and geometry of these features may vary while remaining within the scope of the present subject matter.

According to exemplary embodiments, each of mounting slots 226 and mounting tabs 240 may generally extend downward along the vertical direction V. In this regard, mounting slots 226 and mounting tabs 240 may generally define an extension angle 244 (see, e.g., FIG. 9) measured relative to the horizontal direction. According to exemplary embodiments, this extension angle 244 may be between about 0° and 60°, between about 10° and 50°, between about 20° and 40°, or about 30°. Other extension angles and profiles are possible and within the scope of the present subject matter. Notably, forming mounting slots 226 and mounting tabs 240 in this manner may ensure secure engagement of grow modules 202 to module support frame 200, with additional weight facilitating improved engagement.

Notably, as explained above, lateral side supports 232 of grow modules 202 may be secured to module support frame 200 and may form a substantial seal with vertical support members 220 to isolate grow chambers 170 from root chamber 172. In addition, grow modules 202 may be stacked on top of each other in a manner that achieves a partial or substantial seal therebetween. In this manner, when module support frame 200 is filled with grow modules 202, root chamber 172 may be substantially isolated from the remainder of climate-controlled chamber 122.

More specifically, according to the illustrated embodiment, each of the plurality of grow modules 202 may generally define an upper mating flange 250 and a lower mating flange 252 defined at the top and bottom of grow modules 202, respectively, along the vertical direction V. As illustrated, these mating flanges 250, 252 may be defined by support body 230 and may be complementary to each other. In this regard, when an upper grow module is mounted to module support frame 200 and is seated on top of a lower grow module, the upper mating flange 250 of the lower grow module may be seated against and form a fluid seal with the lower mating flange 252 of the upper grow module. According to the illustrated embodiment, mating flanges 250, 252 may both be sloped downward along the vertical direction V, e.g., to facilitate runoff of condensation within root chamber 172, e.g., to permit the buildup of mold or mildew and maximize hydration efficiency.

Notably, while grow module 202 generally define apertures 174 for supporting plant pods 176, plants 124 grown from these plant pods 176 may commonly need vertical support arms or trellises. Accordingly, the exemplary grow module 202 described herein may include features for supporting such plant growth. More specifically, as best shown in FIGS. 10 through 16, grow module 202 generally defines one or more trellis mounting slots or trellises slots 260 which are generally configured for receiving and supporting trellis arms 262. More specifically, according to the illustrated embodiment, trellis slots 260 may be defined or formed as an undercut in each of side supports 232 grow module 202. In this manner, as explained in more detail below, trellis arm 262 may generally be flexible enough to permit a user to bend trellis arm 262 to wrap it around support body 230 so that trellis arm 262 may be received within trellis slots 260 to secure trellis arm to grow module 202.

As illustrated, trellis arm 262 may generally include a cross member 264 that is supported by one or more support arms 266. In this regard, cross member 264 may generally extend along the circumferential direction C while support arms 266 may extend from sides of cross member 264 toward grow module 202 for engaging trellis slots 260. More specifically, as illustrated, trellis arm 262 may include one or more locking protrusions 270 that extend inward from support arms 266 for receipt within trellis slots 260 to secure trellis arm 262 to grow module 202. Specifically, locking protrusions 270 extend from each support arm 266 toward each other and toward side supports 232 of grow module 202.

Figure 12:
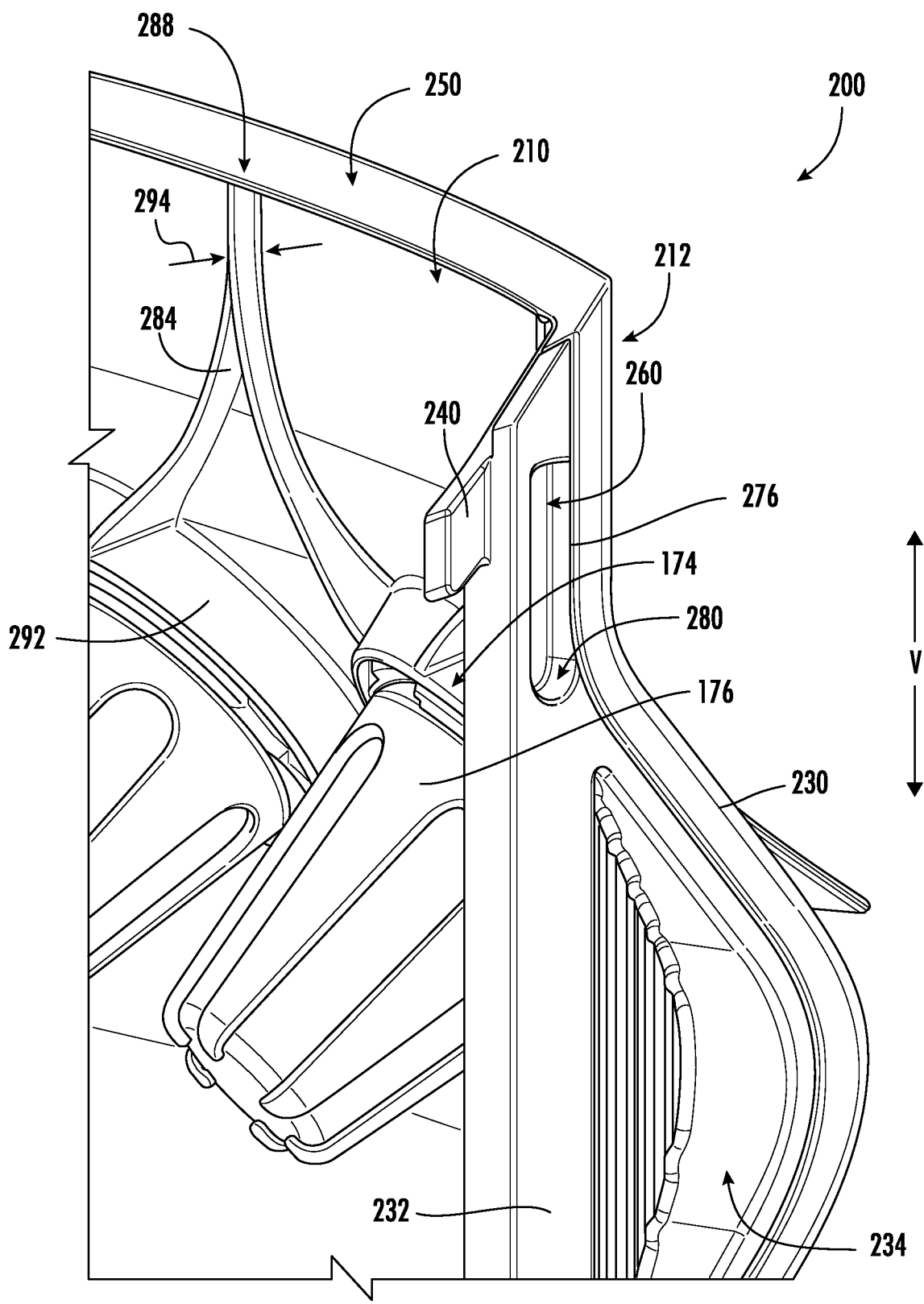
FIG. 12 provides another perspective view of the exemplary grow module of FIG. 8 according to an exemplary embodiment of the present subject matter.
Figure 13:
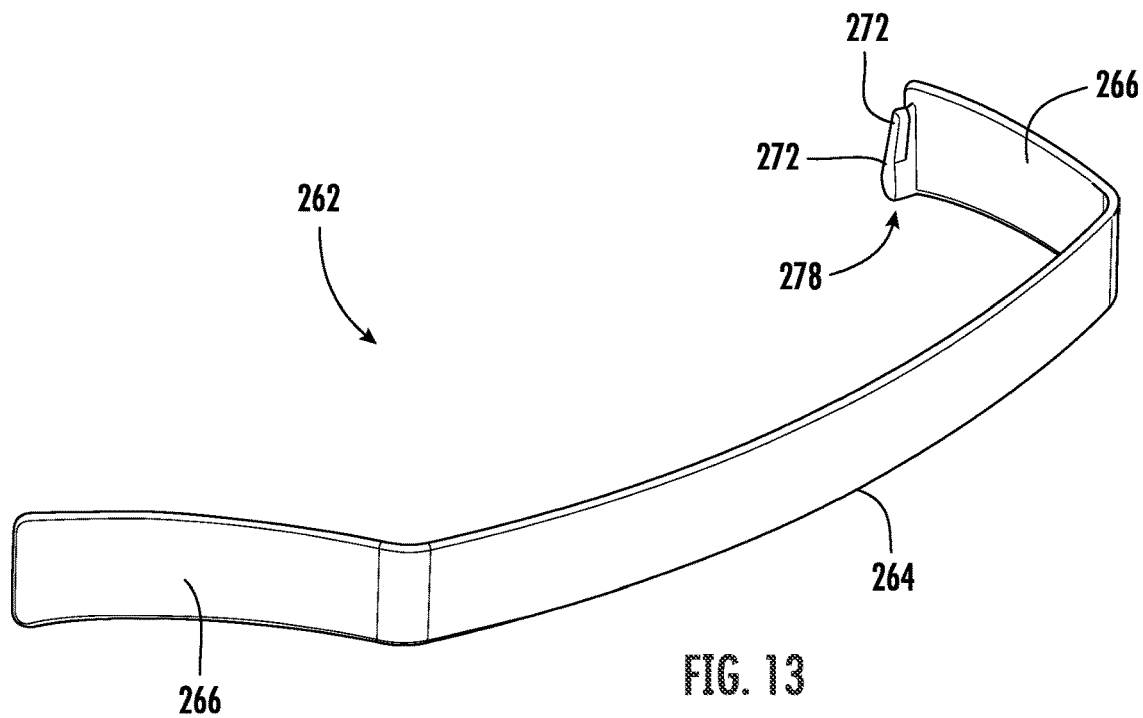
FIG. 13 provides a perspective view of a trellis arm that may be used with the exemplary grow module of FIG. 8 according to an exemplary embodiment of the present subject matter.
Figure 14:
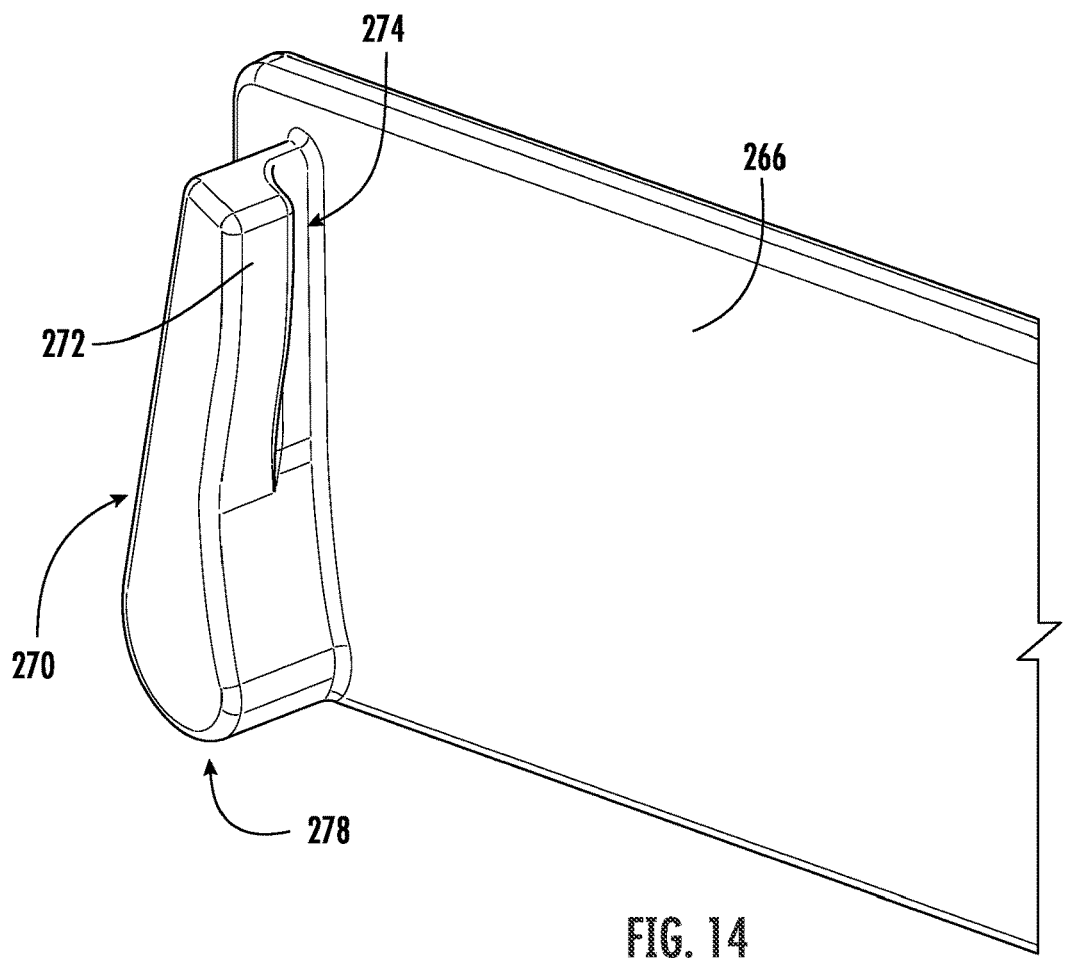
FIG. 14 provides a perspective view of a locking protrusion of the exemplary trellis arm of FIG. 13 according to an exemplary embodiment of the present subject matter.
Figure 16:
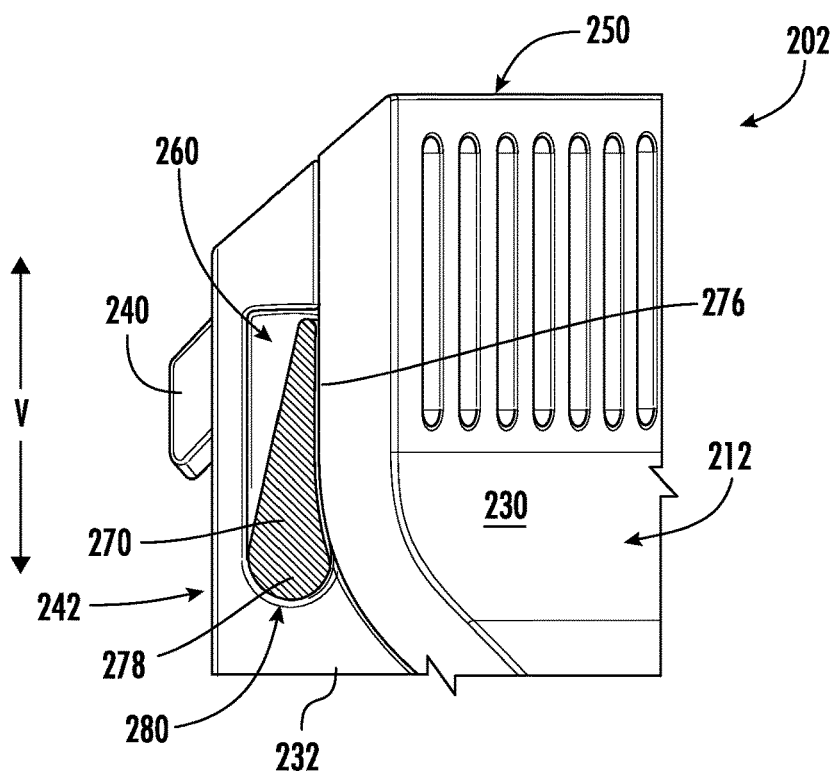
FIG. 16 provides a side view of the exemplary trellis arm of FIG. 13 in an installed position on the exemplary grow module of FIG. 8 according to an exemplary embodiment of the present subject matter.

As best shown in FIG. 14, trellis arm 262 may further include a locking flange 272 that is defined at a distal end of locking protrusion 270 in this regard, for example, locking flange 272 may extend toward cross member 264 such that a locking slot 274 is defined between locking flange 272 and support arm 266. Notably, as best illustrated in FIG. 12, when support body 230 is mounted to or formed with side supports 232 a locking edge 276 of support body 230 may extend into trellis slots 260. More specifically, locking edge 276 of support body 230 may generally be configured for engaging the locking slot 274 of trellis arm 262 when trellis arm 262 is rotated toward the installed position (e.g., as shown in FIG. 16).

Figure 15:
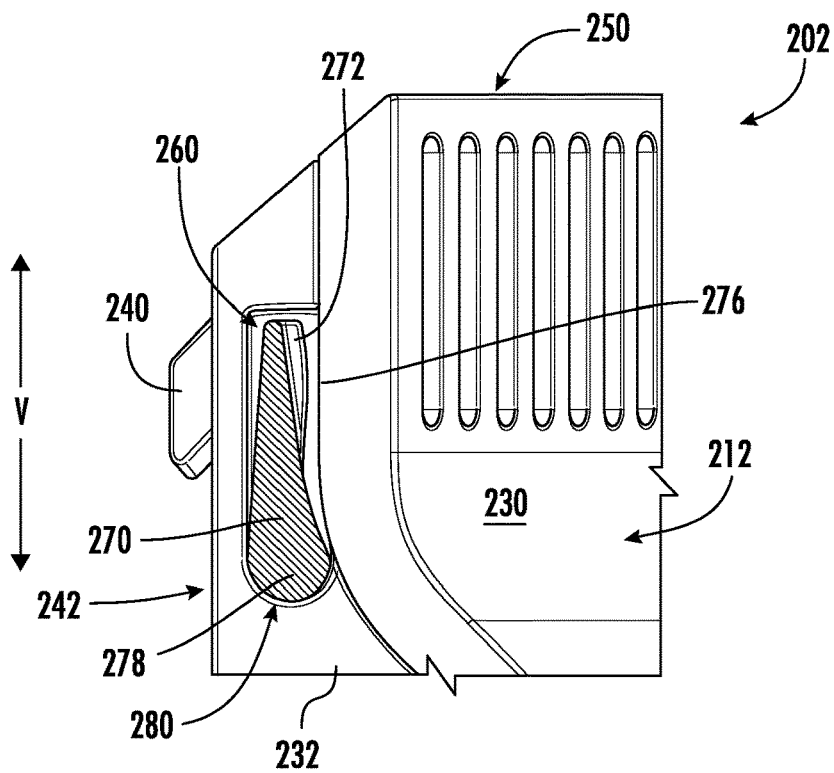
FIG. 15 provides a side view of the exemplary trellis arm of FIG. 13 in an uninstalled position on the exemplary grow module of FIG. 8 according to an exemplary embodiment of the present subject matter.

As best shown in FIG. 15, locking protrusion 270 and locking flange 272 may be inserted into trellis slots 260 when trellis arm 262 is rotated slightly upward (e.g., counterclockwise as shown in FIG. 15). Thus, by rotating trellis arm 262 upward and slightly flexing trellis arm 262, locking protrusion 270 may be inserted into trellis slots 260 and trellis arm 262 may then be rotated downward (e.g., clockwise as shown in FIG. 15) to secure locking edge 276 into locking slot 274. As shown, support arms 266 may define a rounded bottom surface 278 that may be received within a rounded base 280 of trellis slots 260 to permit such rotation. Notably, as plants provide more weight onto cross member 264 of trellis arm 262, locking flange 272 may become more secure within trellis slot 260 and the stability of trellis arm 262 may be increased.

As noted above, hydration and/or nutrient dosing within an aeroponics system may generally be achieved by charging a root chamber with a hydrating mist. In this regard, for example, hydration system 180 may discharge a flow of mist through misting nozzle 182 into root chamber 172. Notably, at least a portion of this mist may collect on inner surfaces within root chamber 172, e.g., such as inner surface 210 of grow modules 202. Accordingly, aspects of the present subject matter may be directed to features for capturing this condensed water and reusing or redirecting it for improved hydration efficiency.

Figure 10:
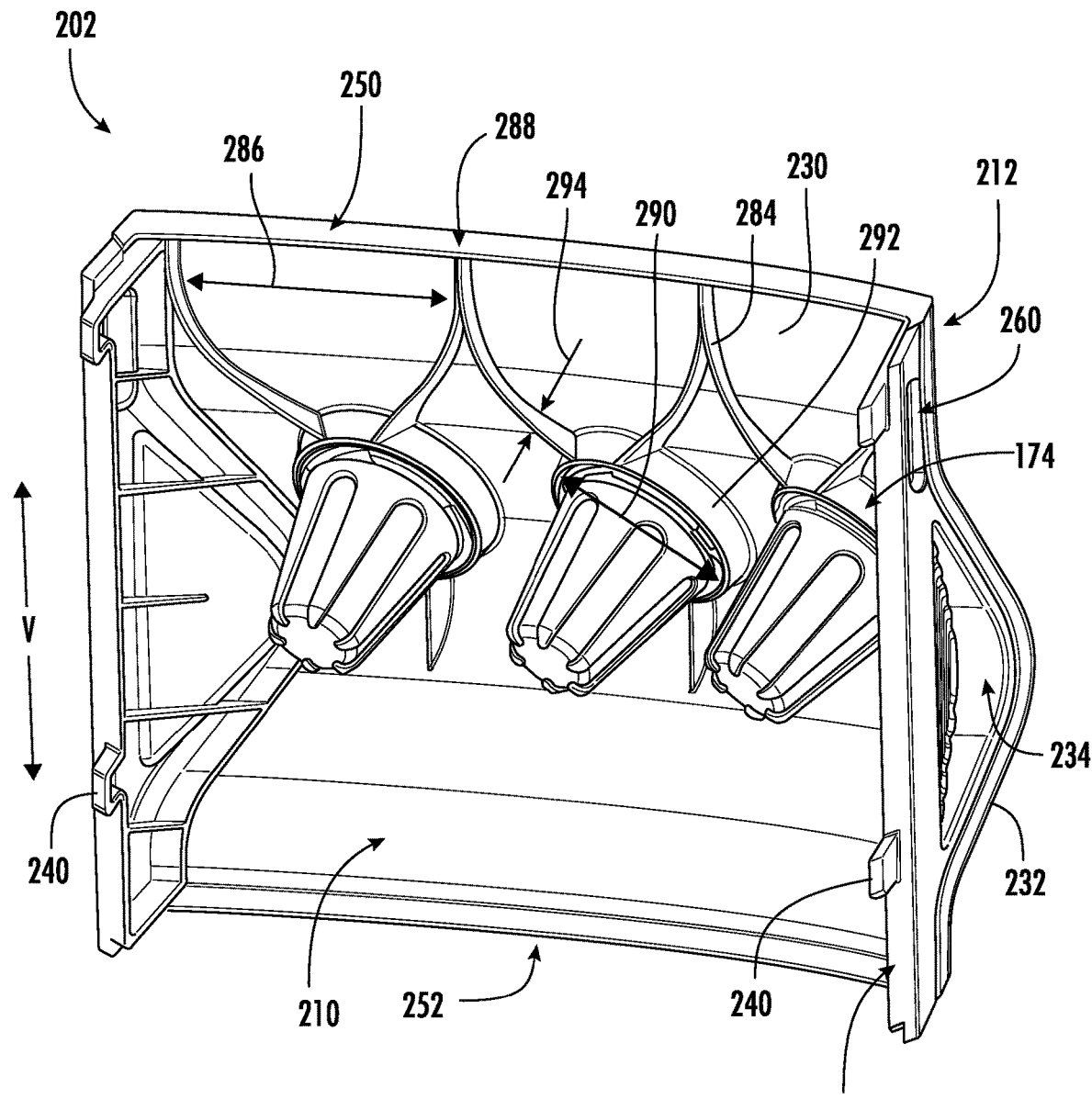
FIG. 10 provides a rear, perspective view of the exemplary grow module of FIG. 8 according to an exemplary embodiment of the present subject matter.
Figure 11:
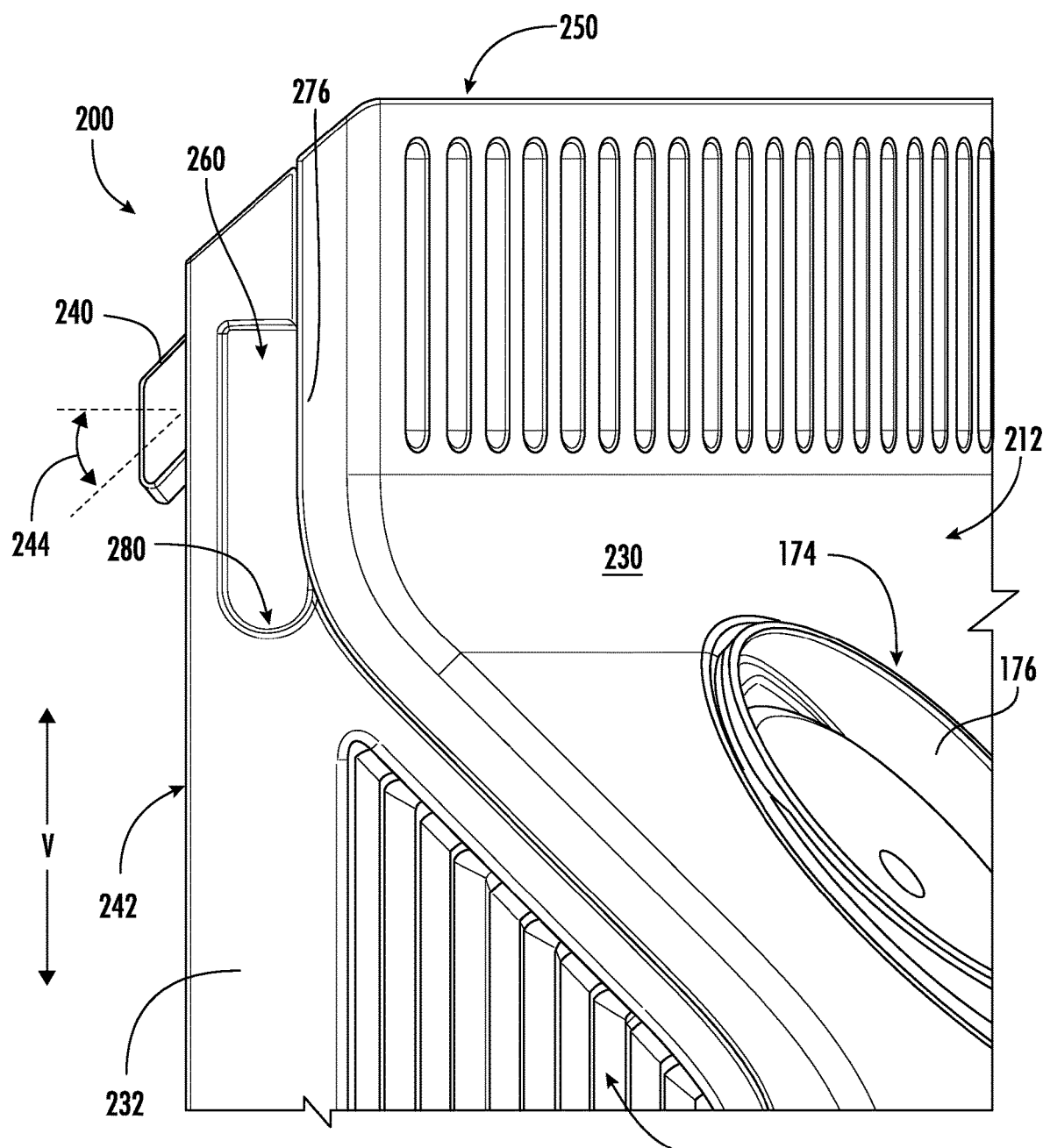
FIG. 11 provides another perspective view of the exemplary grow module of FIG. 8 according to an exemplary embodiment of the present subject matter.

For example, referring now briefly to FIG. 10, grow module 202 may include one or more water collecting ribs 284 that extend from the inner surface 210 of grow module 202 into root chamber 172. In general, these water collecting ribs 284 may be sized, positioned, and oriented toward apertures 174 of grow modules 202 for collecting and directing collecting condensate toward apertures 174, e.g., to hydrate plants 124 positioned therethrough. According to exemplary embodiments, water collecting ribs 284 may be positioned above apertures 174 along the vertical direction V, e.g., to facilitate gravity-driven flow of collected condensate toward apertures 174.

It should be appreciated that grow module 202 and/or water collecting ribs 284 may be formed from any suitably rigid material. For example, according to exemplary embodiments, grow module 202 and water collecting ribs 284 may be formed by injection molding, e.g., using a suitable plastic material, such as injection molding grade Polybutylene Terephthalate (PBT), Nylon 6, high impact polystyrene (HIPS), or acrylonitrile butadiene styrene (ABS). Alternatively, according to the exemplary embodiment, these components may be compression molded, e.g., using sheet molding compound (SMC) thermoset plastic or other thermoplastics. According to still other embodiments, portions of grow module 202 may be formed from any other suitable rigid material.

It should be appreciated that water collecting ribs 284 may generally have any suitable size, shape, and profile for directing collected condensate toward apertures 174. For example, according to the illustrated embodiment, water collecting ribs 284 are curved toward apertures 174. More specifically, each aperture 174 may include two water collecting ribs 284 for collecting and directing condensate toward that respective aperture 174. As illustrated, a width 286 may be defined between adjacent ribs 284, e.g., as measured along a horizontal direction. According to the illustrated embodiment, width 286 decreases as water collecting ribs 284 approach aperture 174. In this manner, collected condensate is captured from a broad surface area and directed toward the relatively small aperture 174. According to the illustrated embodiment, width 286 as measured at a top end 288 of the adjacent ribs 284 is greater than a diameter 290 of aperture 174.

Referring still to FIG. 10, grow module 202 generally defines a tapered interface 292 surrounding aperture 174. According to exemplary embodiments, some or all of the water collecting ribs 284 may terminate against tapered interface 292, e.g., such that collected condensate is directed onto the roots of plants 124. In addition, water collecting ribs 300 may extend from tapered interface 292 all the way to upper mating flange 250 of grow module, e.g., to maximize the surface area of inner surface 210 where condensate is collected. As illustrated, water collecting ribs 284 generally define a rib height 294 measured in a direction normal to inner surface 210 of grow module 200. According to exemplary embodiments, rib height 294 varies along a length of the water collecting ribs 284. More specifically, rib height 294 may increase as water collecting ribs 284 approach apertures 174, e.g., such that collected water does not overcome water collecting ribs 284 and drip into sump 164.

Aspects of the present subject matter are directed to a grow tower with modular grow modules defining apertures for receiving plant pods. The grow modules may define a plurality of mounting tabs that extend at an angle for receipt within complementary mounting slots defined within vertical support members of a module support frame. The grow modules may also provide a mounting interface for removable trellis arms. The trellis arms are located so that they can support the growth of the plants that are grown from the plant pods on the same grow module to which the trellis arm is mounted. This allows for the grow module to be removed from the grow tower without the need to untangle the leafy growth from any other surrounding structures. The grow module may further define handle features on either side of each module allow for easy installation and removal of the grow module.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance defining a vertical direction and a horizontal direction, the gardening appliance comprising:
   a liner positioned within a cabinet and defining a grow chamber; and a grow tower positioned within the grow chamber and defining an axial direction, a circumferential direction, and a radial direction, the grow tower comprising:
- a module support frame comprising a plurality of vertical support members, each of the plurality of vertical support members defining a plurality of mounting slots; and
- a grow module defining a support body defining a plurality of apertures for receiving one or more plant pods, the grow module further comprising a plurality of mounting tabs configured for receipt within the plurality of mounting slots to removably mount the grow module to the module support frame, wherein the grow module further comprises a first side support and a second side support positioned at opposite ends of the support body along the horizontal direction, wherein the plurality of mounting tabs extend from the first side support and the second side support.

2. The gardening appliance of claim 1, wherein the plurality of mounting slots is spaced apart along the vertical direction on the plurality of vertical support members to define a plurality of mounting positions for the grow module.

3. The gardening appliance of claim 1, wherein each of the plurality of slots extends downward along the vertical direction.

4. The gardening appliance of claim 1, wherein the grow module further defines handles or grips within the first side support and the second side support.

5. The gardening appliance of claim 1, wherein the grow tower comprises:
- a plurality of grow modules stacked together and mounted to the module support frame to substantially define and seal a root chamber from the grow chamber.

6. The gardening appliance of claim 5, wherein an outer surface of the support body is convex when viewed from outside the root chamber.

7. The gardening appliance of claim 5, wherein an outer surface of the support body is concave when viewed from outside the root chamber.

8. The gardening appliance of claim 5, wherein each of the plurality of grow modules defines an upper mating flange and a lower mating flange, the upper mating flange and the lower mating flange being complementary such that the lower mating flange of an upper grow module of the plurality of grow modules is seated against the upper mating flange of a lower grow module of the plurality of grow modules when the upper grow module is mounted above the lower grow module on the module support frame.

9. The gardening appliance of claim 8, wherein the upper mating flange and the lower mating flange form a fluid seal between the upper grow module and the lower grow module.

10. The gardening appliance of claim 8, wherein the upper mating flange and the lower mating flange are sloped downward along the vertical direction.

11. The gardening appliance of claim 1, wherein the grow module further defines one or more trellis slots, the grow tower further comprising
- a trellis arm comprising a cross member supported by one or more support arms; and
- a locking protrusion that extends from the one or more support arms for receipt within the one or more trellis slots to secure the trellis arm to the grow module.

12. The gardening appliance of claim 11, wherein the grow module further comprises a first side support and a second side support positioned at opposite ends of the support body along the horizontal direction, and wherein the one or more trellis slots are undercut into the first side support and the second side support of the grow module.

13. The gardening appliance of claim 11, wherein the locking protrusion defines a locking flange at a distal end of the locking protrusion to define a locking slot between the locking flange and the one or more support arms, and wherein a locking edge of the support body extends into the one or more trellis slots to engage the locking slot and secure the trellis arm in an installed position.

14. The gardening appliance of claim 11, wherein the locking flange extends toward the cross member such that the trellis arm is secured by rotating downward from the cross member.

15. The gardening appliance of claim 11, wherein the one or more support arms defines a rounded bottom surface that is received within a rounded base of the one or more trellis slots to permit rotation of trellis arm.

16. The gardening appliance of claim 11, wherein the trellis arm is flexible to permit wrapping of trellis arm around support body.

17. A grow tower for a gardening appliance, the gardening appliance comprising a liner positioned within a cabinet and defining a grow chamber, the grow tower comprising:
- a module support frame comprising a plurality of vertical support members, each of the plurality of vertical support members defining a plurality of mounting slots;
- a grow module defining a support body defining a plurality of apertures for receiving one or more plant pods, the grow module further comprising a plurality of mounting tabs configured for receipt within the plurality of mounting slots to removably mount the grow module to the module support frame, wherein the grow module further defines one or more trellis slots;
- a trellis arm comprising a cross member supported by one or more support arms; and
- a locking protrusion that extends from the one or more support arms for receipt within the one or more trellis slots to secure the trellis arm to the grow module.

18. The grow tower of claim 17, wherein the grow module further comprises a first side support and a second side support positioned at opposite ends of the support body along the horizontal direction, wherein the plurality of mounting tabs extend from the first side support and the second side support.

19. A gardening appliance defining a vertical direction and a horizontal direction, the gardening appliance comprising:
- a liner positioned within a cabinet and defining a grow chamber; and
- a grow tower positioned within the grow chamber and defining an axial direction, a circumferential direction, and a radial direction, the grow tower comprising:
  - a module support frame comprising a plurality of vertical support members, each of the plurality of vertical support members defining a plurality of mounting slots;
  - a grow module defining a support body defining a plurality of apertures for receiving one or more plant pods, the grow module further comprising a plurality of mounting tabs configured for receipt within the plurality of mounting slots to removably mount the grow module to the module support frame; and
  - a plurality of grow modules stacked together and mounted to the module support frame to substantially define and seal a root chamber from the grow chamber, wherein each of the plurality of grow modules defines an upper mating flange and a lower mating flange, the upper mating flange and the lower mating flange being complementary such that the lower mating flange of an upper grow module of the plurality of grow modules is seated against the upper mating flange of a lower grow module of the plurality of grow modules when the upper grow module is mounted above the lower grow module on the module support frame.

20. The gardening appliance of claim 19, wherein the grow module further comprises a first side support and a second side support positioned at opposite ends of the support body along the horizontal direction, wherein the plurality of mounting tabs extend from the first side support and the second side support.

* * * * *